(12) United States Patent
Brouwer et al.

(10) Patent No.: US 8,102,540 B2
(45) Date of Patent: Jan. 24, 2012

(54) CORIOLIS FLOW SENSOR WITH OPTICALLY REFLECTIVE MOTION SENSOR

(75) Inventors: Dannis Michel Brouwer, Enschede (NL); Aditya Mehendale, Ruurlo (NL); Lars Kristiansen, Enschede (NL); Marvin Ernst Eckhard Klein, Oldenzaal (NL); Marcel Ronald Katerberg, Deventer (NL)

(73) Assignee: Berkin B.V., Ruurlo (NL)

( * ) Notice: Subject to any disclaimer, the term of this patent is extended or adjusted under 35 U.S.C. 154(b) by 333 days.

(21) Appl. No.: 12/613,861

(22) Filed: Nov. 6, 2009

(65) Prior Publication Data
US 2010/0122585 A1    May 20, 2010

(30) Foreign Application Priority Data

Nov. 14, 2008 (NL) ...................................... 1036198

(51) Int. Cl.
*G01B 11/14* (2006.01)
(52) U.S. Cl. ............... 356/614; 73/861.355; 73/861.357
(58) Field of Classification Search .................. 356/614; 73/861.355, 861.357
See application file for complete search history.

(56) References Cited

U.S. PATENT DOCUMENTS
5,020,380 A   6/1991  Keita
7,353,718 B2 * 4/2008 Mehendale et al. ..... 73/861.355
7,464,610 B2 * 12/2008 Mehendale et al. ..... 73/861.355
2008/0148868 A1 * 6/2008 Mehendale et al. ..... 73/861.355

FOREIGN PATENT DOCUMENTS
| EP | 1 719 983 | 11/2006 |
| JP | 11-304562 | 11/1999 |
| JP | 2003-177049 | 6/2003 |

OTHER PUBLICATIONS

Search Report dated Mar. 20, 2009, from corresponding Netherlands application.

* cited by examiner

*Primary Examiner* — Tarifur Chowdhury
*Assistant Examiner* — Isiaka Akanbi
(74) *Attorney, Agent, or Firm* — Young & Thompson

(57) ABSTRACT

A Coriolis flow sensor with at least one vibrating flow tube through which a medium flows, includes elements for exciting the tube, and optical detection element for determining the movements of one or several points of the tube based on the principle of reflection of a light beam against the photosensitive surface of a light sensor. The light beam is directed at the tube wall, at a layer provided on this wall, or at an element fastened against this wall, wherein elements for shaping the beam are arranged for making the convergence of the beam in the direction of movement of the tube associated with the Coriolis forces smaller than the convergence in the direction of movement of the tube associated with the excitation forces. The sensitivity in the detection of the small movements of the tube caused by the Coriolis forces is enhanced.

15 Claims, 6 Drawing Sheets

CORIOLIS FLOW SENSOR WITH OPTICALLY REFLECTIVE MOTION SENSOR

The invention relates to a Coriolis flow sensor with a vibrating flow tube through which a medium flows, which flow sensor comprises exciting means for exciting the tube, and optical detection means for determining the movements of at least one point of the tube, said optical detection means comprising a light source for having a light beam incident at the tube wall, at a layer provided on this wall, or at an element attached to this wall, and a light sensor having a photosensitive surface for sensing the light of the light beam after reflection against the tube wall, a layer provided on this wall, or an element attached to this wall.

If in the following it is mentioned that the light beam is incident on, or reflects against, the tube wall, also the cases that incidence on, or reflection against, a layer provided on the tube wall, or an element attached to this wall are meant to be included.

A Coriolis flow sensor comprises at least one tube, or flow tube, through which the medium flows. This tube usually performs an oscillatory excitation movement. A small additional Coriolis movement superimposed thereon is created by the flow. This combination of movements is to be measured in order to determine the flow. The flow sensor for this purpose comprises a detection system by means of which the displacement of one or several points of the tube is detected as a function of time. The detection system may be based on various principles, such as the inductive, capacitive, or optical principle. Within the field of optical displacement sensors there are several possible embodiments. The most widely used by far is the type that may be described as 'optically transmissive'. A displacement sensor of this type comprises a U-shaped housing that is fastened to the frame of the flow sensor with a light source (for example a LED) in one leg of the U and a photocell (for example a phototransistor) arranged opposite the light source in the other leg. A tube part or a projection, fastened to the tube, moving between the two legs of the U, blocks a portion of the light beam between the light source and the photocell, which portion varies with the movement of the tube. The movement can be derived from the change in the electrical signal generated in said photocell. Such a sensor is described in EP-A 1 719 982 (Applicant's ref. no. HF-11) and in EP-A 1 719 983 (Applicant's ref. no. HF-12).

A different embodiment of an optical displacement sensor may be described as 'optically reflective'. This also comprises a light source and a photocell, both attached to the frame of the flow sensor. Here, however, a beam directed from the light source illuminates part of the tube wall or a projection fastened thereto. The photocell is mounted at the same side of the tube, is arranged partly or wholly in the path of the reflected beam, and measures the intensity or the position of the light incident on its photosensitive surface. The basic principle of such a sensor is also described in the cited EP-A 1 719 983 (Applicant's ref. no. HF-12) as well as in the article by P. Enoksson et al. 'A Silicon Resonant Sensor Structure for Coriolis Mass-Flow Measurements' in Journal of Microelectromechanical Systems, Vol. 6, No. 2, June 1997. Without additional measures, however, the sensitivity is inadequate for use in an accurate Coriolis flow sensor.

The present invention has for its object to provide (optical) measures which individually or in combination improve this sensitivity considerably. According to the invention, a Coriolis flow sensor of the kind mentioned in the opening paragraph is characterized in that means for shaping the beam are arranged for making the convergence of the beam in the direction of movement of the tube associated with the Coriolis forces smaller than the convergence in the direction of movement of the tube associated with the excitation forces. A measure for the convergence is the angle of convergence. This is the top angle of the cone of a converging beam. (Analogously a measure for the divergence is the divergence angle, which is the top angle of the cone of a diverging beam.)

By this construction the sensitivity in the detection of the small movements of the tube caused by the Coriolis forces is enhanced. In particular the sensor detects not only translatory movements but also, or possibly exclusively, rotational movements of the tube. This is why reference will mostly be made to a 'motion sensor' in the ensuing text.

In the framework of the invention various means for shaping the light beam are applicable, e.g.:

an astigmatic light source which causes the beam to have different divergences in perpendicular directions, so that in combination with a "normal" spherical lens different convergences in different directions are obtained (most lasers are astigmatic);

a phase plate which causes the light at different places of the beam to have different phase retardations;

an optical component arranged in the incident light beam, like a lens or a mirror, e.g. a spherical lens which is arranged at an angle with respect to the beam, resulting in different focuses in different directions.

According to a preferred embodiment the optical component comprises at least one cylindrical or aspherical converging lens.

In the framework of the invention the angle between the incident and reflected beam can be between 0° and 60°. However, space can be saved, if according to a preferred embodiment the angle between the incident and reflected beam is 0°.

Further advantageous embodiments are described in the claims.

The optically reflective motion sensor according to the invention is highly suitable for use in Coriolis flow sensors of very small tube diameter (<0.1 mm), such as the mass flow sensors manufactured by MST (Micro System Technology) as described, for example, in the article by J. Haneveld et al. 'Highly sensitive micro coriolis mass flow sensor' published in the Proceedings of the MEMS Conference, 13-17 Jan. 2008, Tucson, USA, which is deemed included in the present description by reference, because the diameter of the light spot incident on the tube can be made very small by means of focusing. This possibility is not offered by an optically transmissive sensor, where the application possibilities are limited by the available dimensions of the light source and the photocell (from 0.2 mm upwards). The use of the optically reflective motion sensor according to the invention, however, is not limited to small tube diameters but is equally suitable for the largest known Coriolis flow sensors (tube diameter 1 m).

A few embodiments of the invention will now be described in more detail by way of example with reference to the accompanying Figures.

Figure 1:
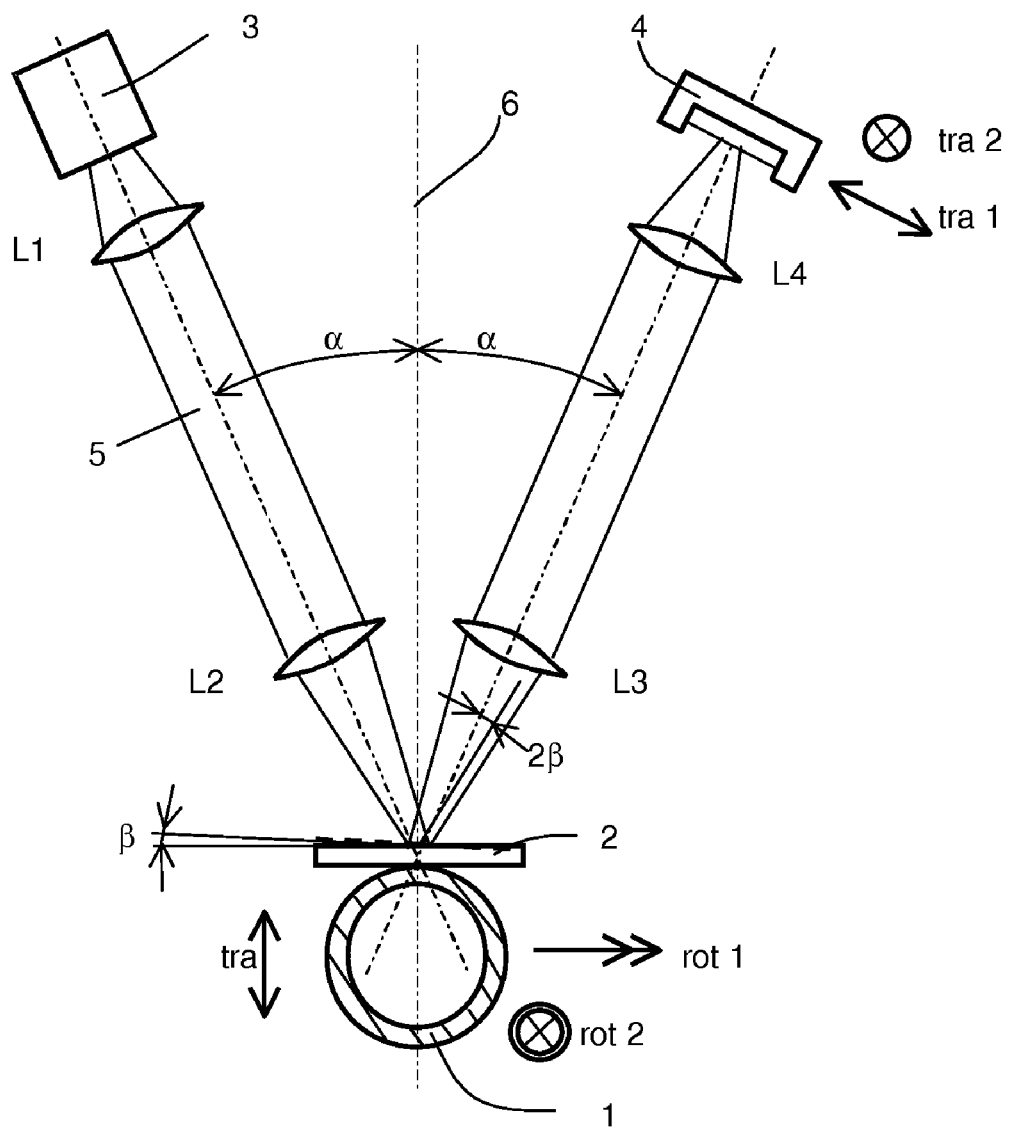
FIG. 1 shows a schematic embodiment of a flow sensor according to the invention with four added lenses whose function will be defined further below.

FIG. 1, which shows an embodiment of a flow sensor according to the invention, is a cross-sectional view of a Coriolis tube 1 with a mirroring surface 2 attached thereto. The sensor comprises a light source 3 and a light sensor 4. Furthermore, two lenses are placed in both the incident and the reflected light beam referenced L1 through L4. These lenses define the shape of the beam and the way in which this is achieved is essential to the invention. The lenses may be of the spherical, cylindrical, or aspherical type. The lenses L1 and L4 are close to the light source and to the light sensor, respectively, and the lenses L2 and L3 are close to the mirroring surface 2.

These components together form a V-shaped optical path for the light beam 5. This V-shape is per definition symmetrical with respect to the perpendicular 6 of a mirroring surface 2 on the tube 1: the incident beam has an angle of incidence $\alpha$ to the perpendicular 6 of the mirroring surface 2, which angle must be greater than zero because the light source 3 and the light sensor 4 do not coincide. The angle of reflection is equal to the angle of incidence by definition. The change in the angle of reflection is twice the angular change $\beta$ of the mirroring surface 2. FIG. 1 shows the plane of the V-shaped optical path as being parallel to the cross-section of the tube 1; however, the principle is equally effective when the plane of the V is not along the cross-section of the tube but longitudinally along the tube, or in any direction in between.

The light source 3 is preferably a laser, but a LED is also suitable in principle (one or several wavelengths, respectively).

The mirroring surface 2 is drawn as being planar, but a concave or convex surface is also effective, subject to the choice of lenses as shown in FIG. 1. This also comprises an embodiment in which the tube wall itself or a layer provided thereon has sufficient reflecting properties. The surface may be made from any material that reflects light: glass, metal, synthetic resin. It is a condition for the V-shaped reflection path, however, that the surface should be as smooth as possible so that the reflected light is not scattered.

The light sensor 4 is of a type that measures the position of the light spot on the photosensitive surface of the sensor. This position determination should be two-dimensional (2-D) in the preferred embodiment such that displacements of the spot in two mutually orthogonal directions perpendicular to the photosensitive surface of the light sensor 4 can be detected independently of one another. These directions have been referenced 'tra 1' and 'tra 2' in FIG. 1, i.e. in the plane of V and perpendicular thereto.

Three primary movements (or a combination thereof) of the tube can be measured with such a 2-D sensor (cf. FIG. 1):

A translation perpendicular to the mirroring surface, indicated with 'tra' adjacent the tube in FIG. 1. This causes a displacement of the spot on the light sensor in the first direction 'tra 1' in accordance with a geometrical function ($2 \times tra \times \sin(\alpha)$), the main characteristic of this displacement being that it increases with a greater angle $\alpha$ and conversely decreases with a smaller angle $\alpha$.

A first rotation about an axis defined by the line of intersection of the mirroring surface and a perpendicular cross-section through the tube, referenced 'rot 1' in FIG. 1. This causes a displacement of the spot on the light sensor in the second direction 'tra 2' equal to twice the first rotation multiplied by the distance between the tube and the light sensor or a collimation lens placed in front thereof (lens L3).

A second rotation about an axis being the longitudinal axis of the tube, referenced 'rot 2' in FIG. 1. This causes a displacement of the spot on the light sensor in the first direction 'tra 1' equal to twice the second rotation multiplied by the distance between the tube and the light sensor or a collimation lens placed in front thereof (lens 3). So this is added to the displacement in the first direction caused by the translation.

Figure 3:
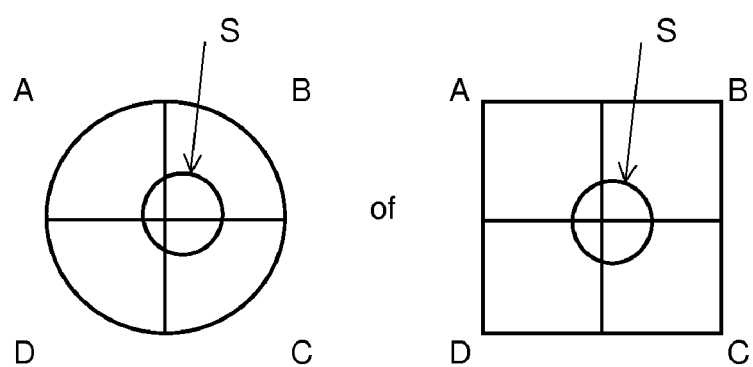
FIG. 3 shows a round and a square embodiment of the photosensitive surface of a quadrant cell with segments A, B, C, and D and a light spot imaged thereon.

Two different embodiments of such a 2-D light sensor 4 are in particular applicable:

The segmented cell, wherein the photosensitive surface is divided into a plurality of independent segments which each measure the respective quantity of light incident thereon. A measurement in two dimensions requires at least three segments which are shaped such that they can determine the position of a light spot imaged on the surface in two mutually orthogonal directions. The most widely used version of this is the quadrant cell or 'quad cell', whose photosensitive surface is divided into four quadrants, and the portion of the spot incident on each quadrant is individually measured (FIG. 3). The following description will accordingly always refer to a quad cell, but the principle is relevant for cells with a minimum of three differently shaped segments as well. Typical dimensions of the photosensitive surface of a quad cell are 1×1 mm.

Figure 4:
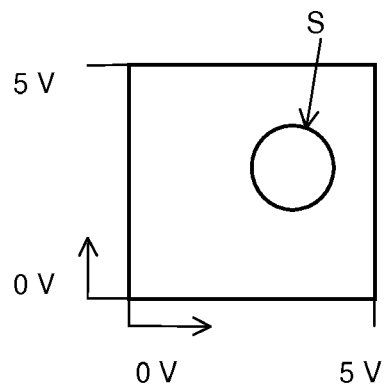
FIG. 4 shows the photosensitive surface of a Position Sensitive Device, a light spot imaged thereon, and typical limit values of possible voltages plotted on the two axes.

The PSD (Position Sensitive Device), which determines the position of the center of the spot relative to the edges of the photosensitive surface in two mutually orthogonal directions (FIG. 4) by means of two independently generated currents or voltages.

The light source 3 emits a light beam towards the tube. A first lens (L1) close to the source forms a parallel ('collimated') beam. Since the diameter of the beam is often larger than the diameter of the tube, especially in the case of very small tubes manufactured by MST (Micro System Technology), it may be necessary to add a second lens (L2) which converges the beam into a small spot. This spot is aimed at the tube wall or at a planar or curved surface fastened thereto. The size of the spot must be smaller than said surface plus any movement amplitude of the tube, so that the full beam is reflected at all times. Since a converging beam upon reflection against a planar or convex surface will diverge, a third lens (L3) may be added, which lens ensures that the diameter of the light beam does not become too large. This convergence may be such that a parallel ('collimated') beam is obtained, or it its effect may be more or less than that. A fourth lens (L4) may optionally be added just before the light sensor 4 for further convergence of the beam. This is dependent on the ratio of the diameter of the light beam to the diameter of the photosensitive surface on the light sensor. Given sufficient space, it would be possible to place either the light source or the light sensor close to the tube. The above means that a number of one to four 'functional' lenses may be required, depending on the geometry. Sometimes the functions of two 'functional' lenses may be combined, or one 'functional' lens is to be subdivided into several 'physical' lenses, for example an aspherical lens into several cylindrical lenses of different focal distances.

An obvious choice would be to make the angle α large so that more room is created for optical components. This increases the sensitivity to the translation mentioned above, but reduces that to the first rotation, while the sensitivity to the second rotation remains unchanged. Said greater translation sensitivity is undesirable because it may also be changed by temperature or gravity. Given a theoretical angle α of 0 degrees, the measurement is completely insensitive to such translations of the tube. This is why a small angle α and a measurement based on rotations is preferred.

Improvement Measure 1: Addition of a Partly Transmitting Mirror.

A first improvement measure described below and depicted in FIG. 2, in which the same reference numerals as in FIG. 1 denote the same components, comprises the addition of a partly light-transmitting mirror 7 with which an angle α of incidence of 0 degrees does become possible. This has the effect that the motion sensor is only sensitive to rotations ('rot 1', 'rot 2') of the tube and not to translations ('tra'). The operating principle is the same as shown in FIG. 1 in all other respects. The partly light-transmitting mirror 7 (often denoted 'beam splitter') is available in two versions:
  a partly light-transmitting mirror that transmits part of the light and reflects another part irrespective of the polarization direction,
  a polarizing beam splitter which reflects a certain polarization direction and transmits the direction perpendicular thereto.

It is the latter type that is used in CD players and that also requires the addition of a quarter wave plate 8 which rotates the polarization direction of the polarized laser light beam (incoming and returning wave) through 90°.

Figure 2:
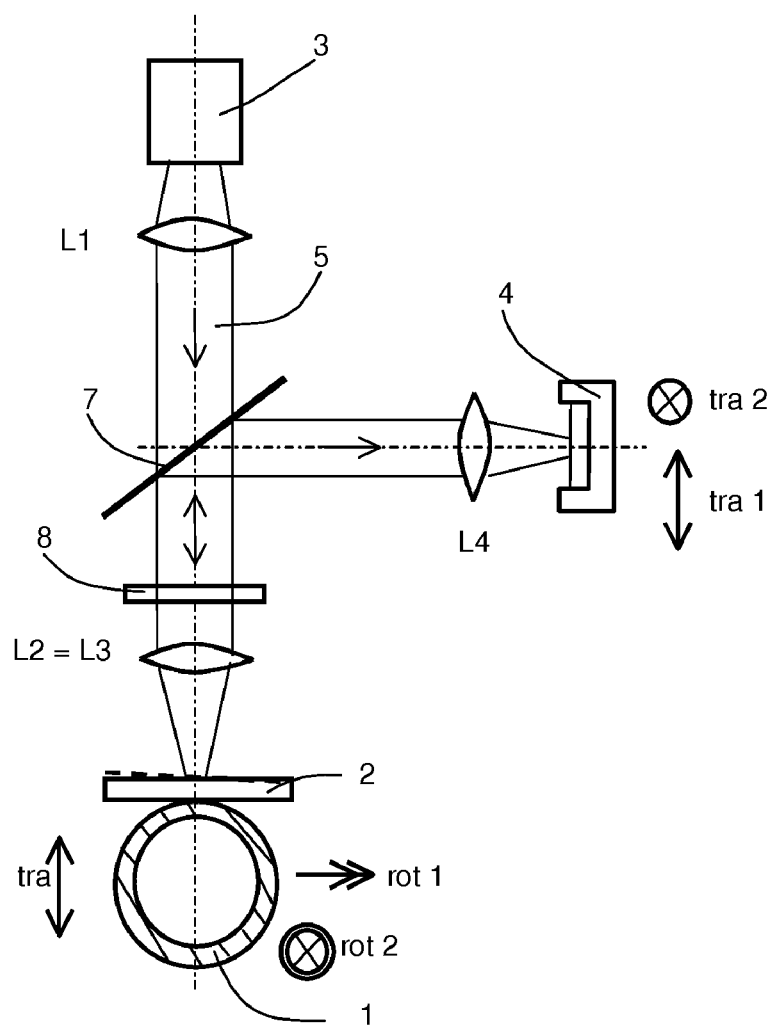
FIG. 2 shows an improved embodiment with perpendicular incidence and reflection, made possible by the addition of a partly light-transmitting mirror and, optionally, a quarter wave length phase retardation plate with which the polarization of a light beam can be rotated through 90°+n times 180° upon having the light pass twice.

FIG. 2 further shows that the converging and collimating functions of 'lens L2' and 'lens L3' have been combined into one 'lens L2=L3', so that at the same time the space problem just above the mirroring surface is solved.

The measuring principle shown in FIGS. 1 and 2 may be used as follows for measuring Coriolis movements in a flow tube. The explanation is based on a quad cell, but the process is similar for a PSD.

Figure 5:
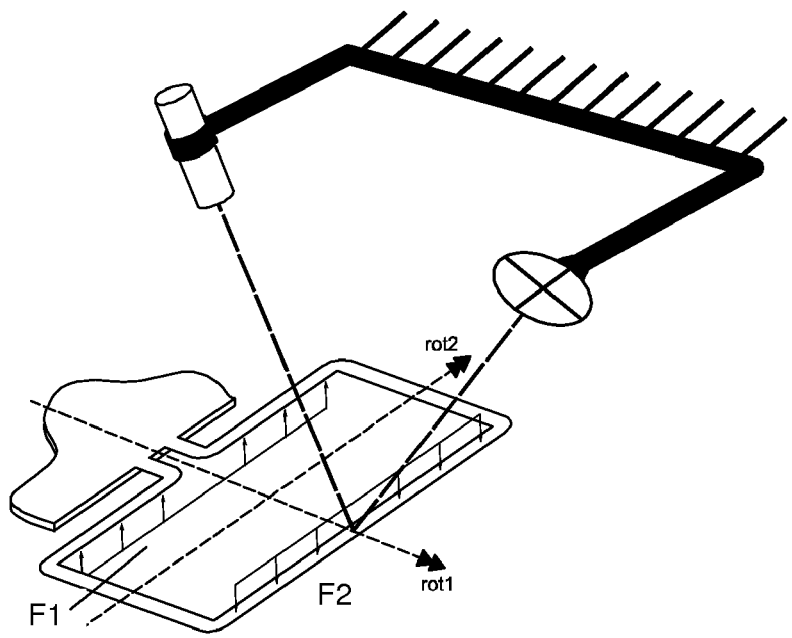
FIG. 5 shows a typical design of the flow tube of a Coriolis flow sensor, wherein the most favorable position of a reflective motion sensor is diagrammatically indicated.
Figure 6:
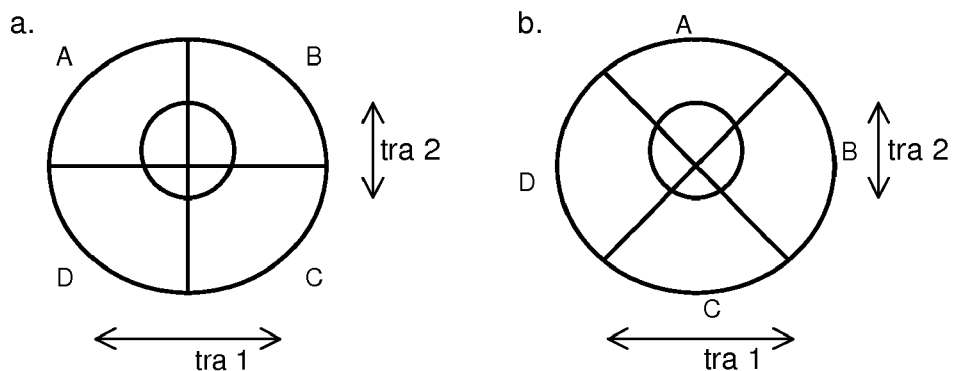
FIG. 6 shows two possible orientations of a quadrant cell relative to the first and the second direction of movement of the light spot.

FIG. 5 shows a rectangular tube shape, but the principle is applicable or any other shape (see, for example, EP-A 1 719 982, Applicant's ref. no. HF-11, FIGS. 4-6). The tube is excited into vibration about a primary axis of rotation 'rot 1'. The optimum position of the reflective sensor, in particular in the embodiment of FIG. 1 which is somewhat sensitive to translations, then is at the point of intersection of said axis with the tube because the translations are a minimum there. The excitation movement causes the reflected spot on the light sensor to move in a first direction 'tra 1' over the photosensitive surface (FIG. 6a). This causes a shift in the quantities of light incident on the segments A+D and B+C. The first difference of (A+D)−(B+C) accordingly changes by double that amount: a differential measurement.

A flow through the tube generates Coriolis forces (F1, F2) in those tube portions that are (partly) perpendicular to the primary axis of rotation (rot 1) (see FIG. 5). This gives rise to second rotation about a second axis 'rot 2' which is perpendicular to the first (FIG. 5). The reflected spot is moved thereby in a second direction 'tra 2' perpendicular to the first (FIG. 6a). This causes a shift in the quantities of light incident on the segments A+B and C+D. The second difference of (A+B)−(C+D) changes by double that amount. The ratio of the first to the second difference is a measure for the mass flow through the tube.

FIG. 6b shows an alternative embodiment in which the quad cell has been rotated through 45° relative to the first and second directions of movement of the light spot. In this case the amplitude of the first movement can be determined from the difference B−D and that of the second movement from the difference A−C. This is slightly less favorable than the version of FIG. 6a because it uses only two fields for each direction, but it does work. It is also possible in principle to reconstruct both directions of movement from any position of the quad cell between FIGS. 6a and 6b if the angle between the direction of movement and quad cell is known.

Further improvement measures relate to the convergence and shape of the light spot incident on the mirroring surface and the quad cell. Without these measures the second difference mentioned above would in fact be smaller than the first difference by many orders of magnitude (1000 to 10 000 times) and accordingly too small for serving as a base for determining the mass flow.

Prior to a description of the relevant measures it is desirable to explain in brief three basic optical concepts.

Basic Concept 1: Convergence-Divergence-Waist.

Figure 7:
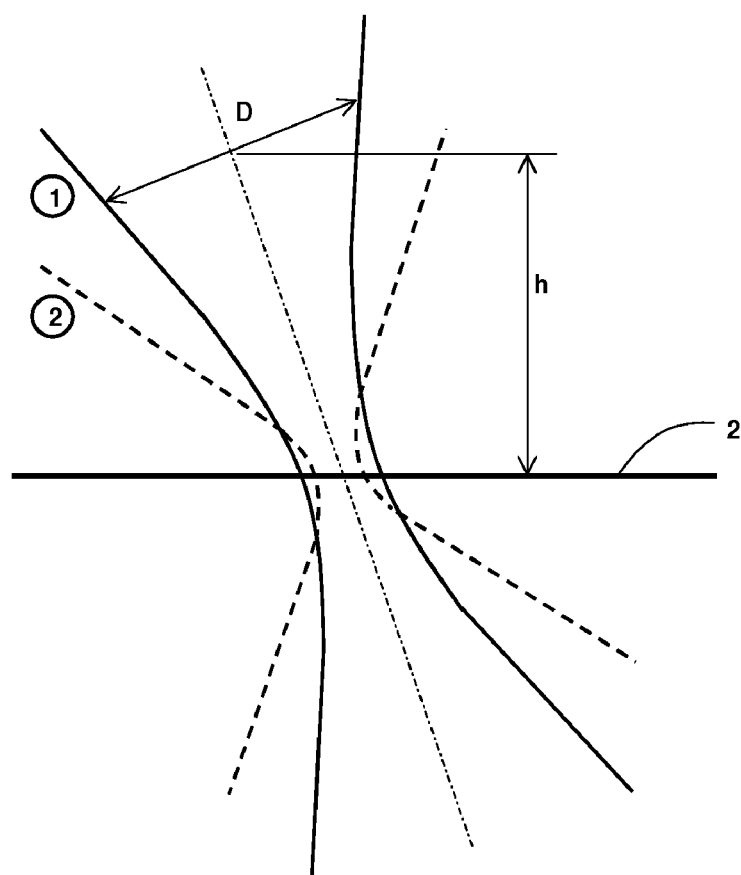
FIG. 7 shows the shape of the light spot adjacent the mirroring surface for two difference convergence values, wherein the reflected beam has been reversed through the mirroring surface for the sake of clarity.

The convergence of the light beam downstream of lens L2 in FIG. 1 towards the mirroring surface also determines the divergence after reflection. Two different light beams are shown in FIG. 7; the reflected beams have been reversed through the mirroring surface for the sake of clarity. Beam 1 is less convergent than beam 2 and is accordingly narrower at a given height h above the mirror. It is also apparent that the beam width in the focus is never completely zero but that a minimum width or 'waist' remains, said waist being narrower in the more convergent beam.

Basic Concept 2: Beam Width-Optical Lever.

Figure 8:
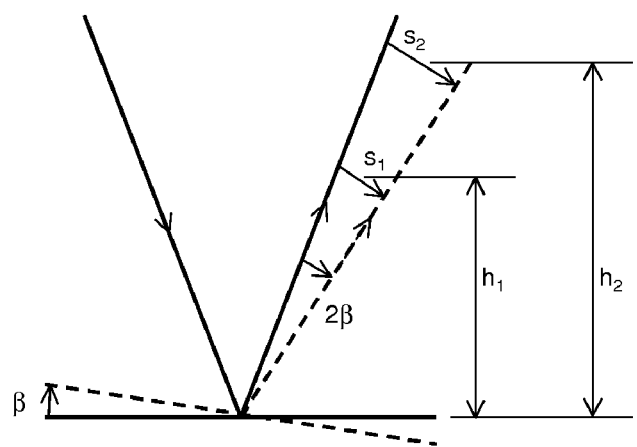
FIG. 8 shows the principle of an optical lever.

The smaller divergence (smaller angle of divergence) of beam 1 in FIG. 7 renders a greater distance between the mirroring surface and lens L3 possible: the diameter D of a light beam is usually limited by the dimensions of the lenses used (especially in an MST application). The maximum value D is reached at a greater distance h from the mirror in the case of beam 1. FIG. 8 shows the advantage of this: given a certain angular rotation α of the mirror (=the tube), a greater distance h (h2 instead of h1) provides a greater lateral displacement of the spot (s2 instead of s1). This accordingly increases the sensitivity of a light sensor placed in the path of the reflected beam. The distance h is also denoted the 'optical lever'.

Basic Concept 3: Spherical-Cylindrical-Aspherical Lenses.

A spherical lens changes the convergence of an incident light beam by the same amount in all directions; a cylindrical lens in one direction only. The aspherical lens is an intermediate form. A cylindrical lens achieves that an incident round light beam has become oval after leaving the lens, which ovality changes with the distance to the lens, but the core of the matter is that the light beam is given a different convergence/divergence in the different planes that can be constructed through the centerline of the beam.

These basic concepts may serve to clarify a number of measures for enhancing the sensitivity of the measurement.
Improvement Measure 2: Different Divergences for Excitation and Coriolis Directions.

The optical lever, i.e. the distance between the mirroring surface and the light sensor (or a lens L3 placed in front thereof in the reflected beam), is enlarged for the Coriolis movement through the use of cylindrical or aspherical lenses which are positioned such that the convergence of the light beam mirrored against the tube wall is chosen to be smaller in the Coriolis direction than in the excitation direction. This implies in the case of cylindrical lenses that the longitudinal axis must coincide with the axis of rotation of the excitation movement.

These lenses (FIG. 1, 'lens L2' and 'lens L3') should preferably be positioned both in the incident and in the reflected light path and may be combined into a single lens through which the incident and the reflected beam pass (FIG. 2, 'lens L2=L3'). In an alternative embodiment a concave reflecting surface (concave reflector or concave mirror) may be used instead of a lens. This measure is applicable in a quad cell as well as in a PSD.
Improvement Measure 3: Optimizing the Height/Width Ratio of the Spot on the Quad Cell.

The cylindrical and/or aspherical lenses in the positions of lens L3 and lens L4 shape the height/width ratio of the light spot imaged on the quad cell such that a minimum quantity of light passes from one half to the other half per unit of displacement in the excitation direction and a maximum quantity in the Coriolis direction. Reason: a large stroke length is desired in the excitation direction because of the large displacements, resulting in a low sensitivity of the quad cell in this direction, whereas in the Coriolis direction a high sensitivity is desired in view of the small displacements. It is not only the convergence described in the previous measure, but also the shape of the spot on the quad cell that can contribute to this.

Figure 9:
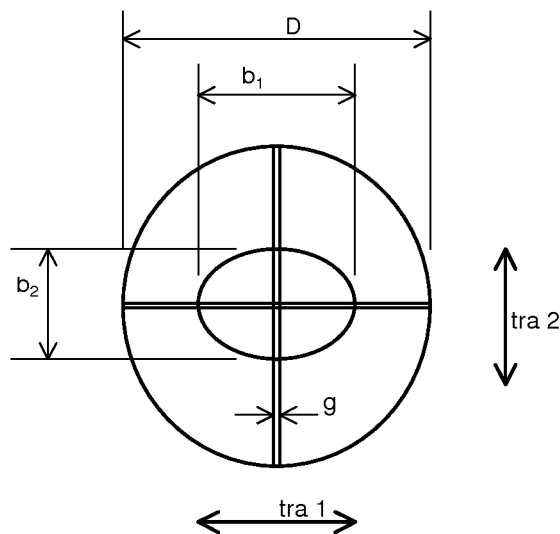
FIG. 9 shows the dimensions of an oval light spot on the quadrant cell that are to be optimized.

FIG. 9 shows a circular cell with a diameter D and a gap g between the quadrants (but the effect is the same for a square or differently shaped cell). When the excitation movement of the spot takes place in the direction 'tra 1', a minimum amount of illuminated surface area will shift from the right to the left half per unit of displacement if the spot is at its widest in that direction. Given a peak-to-peak value of the amplitude of the excitation movement Ae, the maximum possible width of the spot is given by:

spot width (excitation)$b1=D-g-Ae$

In the Coriolis direction (FIG. 9, 'tra 2') it is desirable to displace as much light surface area from the lower to the upper half for a small displacement of the spot. This requires a small spot size in this direction. The stroke range here in fact does not constitute a limitation in practice. Given a peak-to-peak value of the amplitude of the Coriolis movement Ac at maximum flow, the minimum possible spot height is given by:

spot width(Coriolis)$b2=g+Ac$

Obviously, some margins have to be observed in practice because of adjustment tolerances and non-linearities. In addition, it should be prevented that the spot is imaged entirely on one half of the cell for any amplitude.
Improvement Measure 4: Optimizing the Ratio of Divergence Angle to the Waist Radius, Both for the Coriolis Direction.

The divergence angle of the spot imaged on the tube wall multiplied by the distance between the tube wall and the collimating 'lens L3' placed in the reflection path is chosen to be small in the Coriolis direction as compared with the waist width of the light beam in the Coriolis direction at the area of the tube wall. Only if this condition is satisfied is the optical lever optimally utilized. Reason: this is demonstrated with reference to FIG. 10. The light beam illuminates a point on the mirroring surface 2 attached to a tube 1 (not shown) that performs small oscillatory rotations β in the Coriolis direction. A converging lens (not shown) is arranged in the incoming beam in position 2 with the result that the reflected beam diverges with a divergence angle δ. This is converted by a collimating lens in position 3 into a collimated beam that is directed at the quad cell type light sensor 4. The distance between 'lens L3' and quad cell 4 is irrelevant because the beam undergoes only parallel shifts after this lens.

Owing to changes in the tube angle β, the center of the spot is shifted by a distance y on the quad cell. It was described with reference to measure 2 that this displacement can be increased by means of an optical lever. It was described with reference to measure 3 that the radius of the spot on the quad cell in the Coriolis direction must be above a certain minimum. The relation between this displacement and this radius is given by the equation below, with the tube angle β multiplied by the optical lever h in the numerator and the radius r of the spot in the denominator, this radius being the sum of the waist radius $r_0$ and the divergence angle δ multiplied by the lens distance h. The ratio of numerator to denominator is a measure for the sensitivity, i.e. the amount of illuminated surface area that is shifted from the one to the other quad cell half.

$$\frac{y}{r} = \frac{2 \cdot \beta \cdot h}{\delta \cdot h + r_0}$$

It is clear from the equation that the lever length h eliminates itself from the numerator and denominator if the waist radius $r_0$ is small relative to the divergence angle multiplied by the lens distance h. Conversely, a high value of $r_0$ leads to a small δ value, and thus to a lever action up to a high value of h. A small h value, however, then gives a lower sensitivity than in the case of a high $r_0$ value. This condition is the fourth improvement measure, which is applicable in a quad cell only, not in a PSD.

Figure 11:
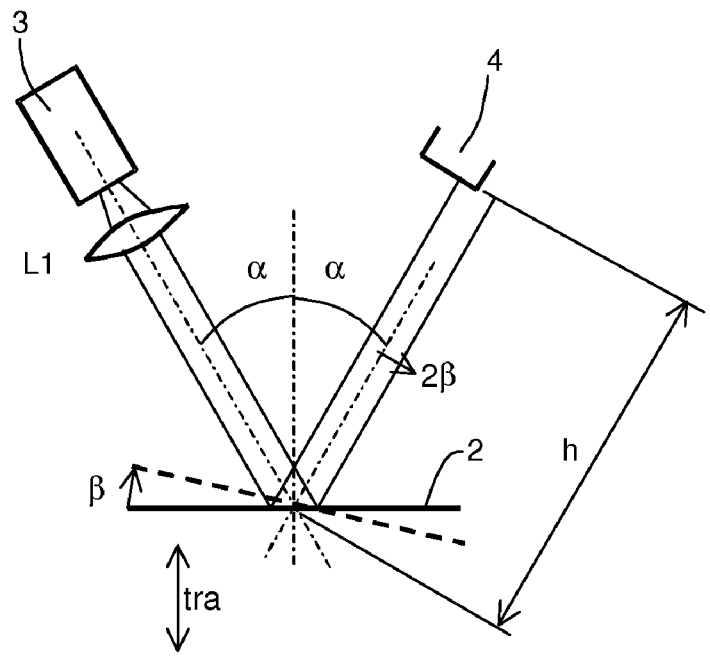
FIG. 11 shows a simple embodiment based on partial reflection of the light beam against the light sensor.
Figure 12:
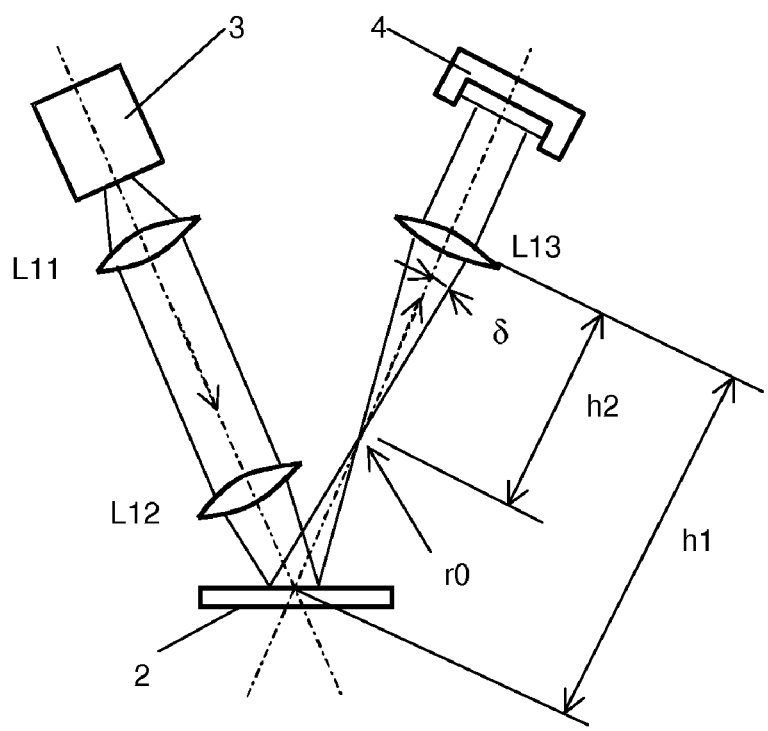
FIG. 12 shows a schematic flow sensor according to the invention in which the incident light beam is not focused on the tube wall, but in which the focus point lies in the path of the reflected light beam.

FIG. 11 shows a particularly simple embodiment to which the first and the second improvement measure can be applied, i.e. the partly light-transmitting mirror and the optical lever h. The reflective motion sensor is placed not in the center of rotation of 'rot 1' now, as shown in FIG. 5, but outside this center. In the base state, 50% of the reflected light beam falls outside the light sensor in this embodiment. This percentage is made higher or lower by the combination of translation 'tra' (in versions without partly light-transmitting mirror) and rotation β. The light sensor may be a conventional single photodiode or phototransistor in this case, so no quad cell or PSD. It is not possible now to measure the displacement and/or angular rotation of the tube 1 (not shown) to which mirroring surface 2 is attached, in two separate directions with a single motion sensor. Several such detectors are required in one or several positions of the tube. This is comparable to the method described in EP-A 1 719 983 (Applicant's ref. no. HF-12), but with reflective instead of transmissive motion sensors.
Improvement Measure 5:

This measure relates to an arrangement in which the converging light beam is not focused on the mirroring surface 2 of the tube 1 (not shown), or on the tube wall, but the point of maximum convergence (the 'waist') is laid in a point of the beam in the reflected path between (the mirroring surface of) the tube and the light sensor 4. FIG. 12 shows the principle. Light of the light source 3 is directed onto the tube 2 by means of lenses L11 and L12. In the path of the light reflected against the tube a (collimating) lens L13 is arranged between the tube and the light sensor 4. The light sensor 4 could alternatively be directly arranged in this location.

Figure 10:
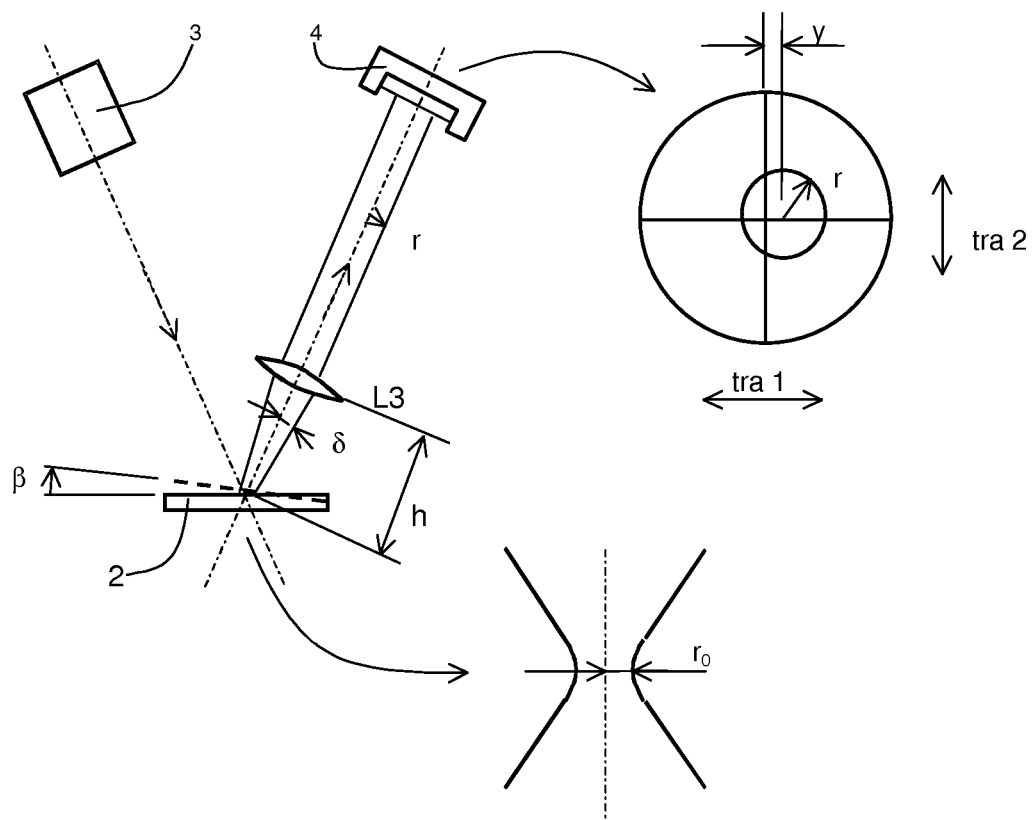
FIG. 10 shows the principle of the optimization of the ration of angle of divergence to the waist diameter.

The difference between this Figure and the previous FIGS. 1 and 10 is that the latter two only show the situation in which focusing takes place on the tube wall, i.e. the focus (or waist) of the beam coincides with the point of reflection (the tube wall). Instead of the length h of FIG. 10 there are now two different relevant distances, which are referenced h1 and h2 in FIG. 12.

The advantage of this can be clarified with reference to the sensitivity function y/r discussed in improvement measure 4. The numerator y thereof contains the optical lever h1, which is still the distance between the tube wall and the light sensor (for example a quad cell) or a collimating lens placed in front thereof also in the case where the focus is not on the tube wall. The denominator r is the radius of the imaged spot which is partly determined by the distance h2 between the focus and the light sensor or a collimating lens placed in front thereof. In the case of focusing on the tube wall it holds that: h1=h2=h. The sensitivity function thus becomes:

$$\frac{y}{r} = \frac{2 \cdot \beta \cdot h_1}{\delta \cdot h_2 + r_0}$$

In the situation of FIG. 12, h1 is greater than h2, and the sensitivity y/r is accordingly greater than if focusing were to take place on the tube wall. The sensitivity can be increased a number of times in this manner relative to the situation in which focusing does take place on the tube wall.

The principle is advantageous especially in the Coriolis direction of movement of the beam, which can be achieved by means of cylindrical or aspherical lenses.

An optional collimating lens arranged in the reflected light path was mentioned above. Measure 5 is also effective in principle if this lens is converging or diverging.

Summarizing, the invention offers a Coriolis flow sensor with at least one vibrating flow tube through which a medium flows, which flow sensor comprises means for exciting the tube, and optical detection means for determining the movements of one or several points of the tube based on the principle of reflection of a light beam against the photosensitive surface of a light sensor, which light beam is directed at the tube wall, at a layer provided on this wall, or at an element fastened against this wall, wherein means for shaping the beam are arranged for making the convergence of the beam in the direction of movement of the tube associated with the Coriolis forces smaller than the convergence in the direction of movement of the tube associated with the excitation forces. Hereby the sensitivity in the detection of the small movements of the tube caused by the Coriolis forces is enhanced. More in particular, the means for shaping the beam are arranged such that the sensor will detect not only displacements (translations) of (points of) the tube, but also, or even exclusively, rotations of (points of) the tube.

The invention claimed is:

1. A Coriolis flow sensor with a vibrating flow tube through which a medium flows, which flow sensor comprises exciting means for exciting the tube, and optical detection means for determining the movements of at least one point of the tube, said optical detection means comprising a light source for having a light beam incident at the tube wall, at a layer provided on this wall, or at an element attached to this wall, and a light sensor having a photosensitive surface for sensing the light of the light beam after reflection against the tube wall, a layer provided on this wall, or an element attached to this wall, characterized in that means for shaping the beam are arranged for making the convergence of the beam in the direction of movement of the tube associated with the Coriolis forces smaller than the convergence in the direction of movement of the tube associated with the excitation forces.

2. A Coriolis flow sensor as claimed in claim 1, characterized in that the means for shaping the beam comprise an optical component arranged in the incident light beam.

3. A Coriolis flow sensor as claimed in claim 2, characterized in that the optical component comprises at least one cylindrical or aspherical converging lens.

4. A Coriolis flow sensor as claimed in claim 2, characterized in that the optical component is arranged such that the height/width ratio of the light spot imaged on the light sensor is such that the spot dimension in the direction associated with the Coriolis movement is substantially smaller than the spot dimension in the direction associated with the excitation movement.

5. A Coriolis flow sensor as claimed in claim 4, characterized in that the optical component comprises at least one cylindrical or aspherical lens.

6. A Coriolis flow sensor as claimed in claim 2, characterized in that the optical component is arranged such that the divergence of the spot imaged on the tube wall multiplied by the distance measured in the Coriolis direction between the tube wall and a collimating lens placed in the reflection path is small with respect to the waist width of the light beam in the Coriolis direction at the location of the tube wall.

7. A Coriolis flow sensor as claimed in claim 2, characterized in that the optical component is arranged such that the divergence of the light beam multiplied by the distance in the Coriolis direction between the focus of said beam and the light sensor is smaller than the waist width of the light beam in the Coriolis direction at the location of the focus, said focus lying in the reflected light path between the tube and the light sensor.

8. A Coriolis flow sensor as claimed in claim 7, wherein an additional optical element is arranged in the reflected light path.

9. A Coriolis flow sensor as claimed in claim 1, characterized in that the angle between the incident and the reflected light beam is greater than 0° and smaller than 60°.

10. A Coriolis flow sensor as claimed in claim 1, characterized in that the angle between the incident and the reflected light beam is 0°.

11. A Coriolis flow sensor as claimed in claim 10, characterized in that a partly light-transmitting mirror is arranged to make the angle between the incident and the reflected light beam 0°.

12. A Coriolis flow sensor as claimed in claim 10, characterized in that a polarizing beam splitter is arranged to make the angle between the incident and the reflected light beam 0°, and in that a quarter wave length plate which rotates the polarization direction of light passing twice through 90°+n times 180° is arranged in the light path between said beam splitter and the tube.

13. A Coriolis flow sensor as claimed in claim 1, characterized in that the light sensor is a segmented cell on which the entire light beam is imaged.

14. A Coriolis flow sensor as claimed in claim 13, characterized in that said segmented cell is arranged as a quadrant cell.

15. A Coriolis flow sensor as claimed in claim 1, characterized in that only a portion of the reflected light beam is imaged on the photosensitive surface of the light sensor, and means are provided for determining the fraction of the light incident on the light sensor, which is a measure for the movements of the point of the tube.

* * * * *